United States Patent
Fisher et al.

(10) Patent No.: US 6,247,096 B1
(45) Date of Patent: Jun. 12, 2001

(54) HANDLING EJECT REQUESTS OF LOGICAL VOLUMES IN A DATA STORAGE SUBSYSTEM

(75) Inventors: James Arthur Fisher; Anthony Andrew Lambert; Jonathan Wayne Peake, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/184,053

(22) Filed: Nov. 2, 1998

(51) Int. Cl.$^7$ .................................................. G06F 12/00
(52) U.S. Cl. ........................... 711/114; 711/156; 707/204
(58) Field of Search ........................... 707/202, 103–204; 369/34; 711/114, 112, 4, 6, 156

(56) References Cited

U.S. PATENT DOCUMENTS

| | | | |
|---|---|---|---|
| 5,193,184 | * | 3/1993 | Belsan et al. ........................ 395/600 |
| 5,197,055 | * | 3/1993 | Hartung et al. ........................ 369/34 |
| 5,325,523 | * | 6/1994 | Beglin et al. ........................ 395/600 |
| 5,403,639 | | 4/1995 | Belsan et al. ........................ 707/204 |
| 5,546,557 | | 8/1996 | Allen et al. ........................... 711/111 |
| 5,761,503 | * | 6/1998 | Fisher .................................... 711/170 |
| 5,870,732 | * | 2/1999 | Fisher et al. ............................... 707/1 |
| 5,940,849 | * | 8/1999 | Koyama .................................... 711/4 |
| 5,963,971 | * | 10/1999 | Fosler et al. ........................... 711/114 |
| 6,031,798 | * | 2/2000 | James et al. ............................. 369/34 |

OTHER PUBLICATIONS

Logical Grouping of Data Storage Media in a Library System, IBM Technical Disclosure Bulletin, vol. 35, No. 5, Oct. 1992, pp. 17–20.

"IBM Magstar Model B16 Virtual Tape Server Elements of Performance" IBM Advanced Technical Support Center, Dec. 19, 1997.*

Bauske, Carl "IBM 3494 B18 HPO Virtual Tape Server, A Paper Describing the Relationship Between Attributes of Virtual Volumes and Physical Storage Requirements" Nov 10, 1999.*

* cited by examiner

*Primary Examiner*—John Breene
*Assistant Examiner*—Khanh Pham
(74) *Attorney, Agent, or Firm*—John H. Holcombe; Robert M. Sullivan (57) ABSTRACT

A method of handling eject requests of logical volumes received by a data storage subsystem from a host system. The method, implemented in computer readable program code, first places identified logical volumes in scratch categories. An eject request is received from a host system, to eject a logical volume from the data storage subsystem. The method responds to the eject request to determine whether the requested logical volume is in a scratch category; if the requested logical volume is determined as to be in a scratch category, a virtual media server is notified that the requested logical volume is deletable, and the virtual media server determines from its database whether the status of the requested logical volume allows deletion thereof. If the virtual media server status determining step allows deletion of the requested logical volume, the requested logical volume is deleted from both the virtual media server database and the library manager database. Then, the requesting host system is notified of the deletion of the requested logical volume.

27 Claims, 4 Drawing Sheets

HANDLING EJECT REQUESTS OF LOGICAL VOLUMES IN A DATA STORAGE SUBSYSTEM

DOCUMENTS INCORPORATED BY REFERENCE

Commonly assigned U.S. Pat. No. 5,546,557 is incorporated for its showing of a system for storing and managing plural logical volumes in each of several physical media volumes in an automated data storage library.

TECHNICAL FIELD

This invention relates to the management of logical volumes in a data storage subsystem, and, in particular, to the handling of eject requests from a host system for logical volumes, by a virtual media server and library manager in a data storage subsystem.

BACKGROUND OF THE INVENTION

Computer data to be stored on removable media is typically arranged in data volume units that originally corresponded to one data storage media, such as a reel of tape or tape cartridge or cassette, or an optical disk or cartridge. The capacity of such storage media has grown substantially in recent years. Thus, the average size of data sets in most computer or data processing centers is significantly less than the capacity 5 of the data storage media volumes. Most programming support for peripheral data storage is directed at only the original volume units and does not provide a general solution to storing multiple data sets in the same volume. Consequently, a development for better utilizing the full capacity of a removable media cartridge (also called a media volume or a physical volume) is to store multiple volumes (called virtual or logical volumes) on a single physical volume in a stacked fashion. Data which would have been stored in multiple, mostly unused physical volumes are collected and stored on a single physical volume in separately addressable, host-processor defined logical data storage volumes. The '557 patent describes the creation and management of such logical volumes and the associated physical volumes in an automated virtual storage and retrieval library. As the result, the host processor treats only logical volumes as though they were separate physical media volumes, and the library manages the access to the logical volumes by accessing the associated physical volumes. A subsystem providing automatic management of tape data storage having such logical volumes is called a virtual media server. As can be appreciated, the management of contention for disparate logical volumes on the same physical volume can be very difficult. The patent incorporated by reference is directed to providing solutions to these problems by such a virtual media server and a library manager. The patent describes establishment of stored tables of logical volume records and of physical volume records for managing the data storage.

Presently, the typical number of logical volumes contained in a single physical volume is approximately 50. The number of cartridges stored in storage cells in a typical tape library may be 1,000, with the result that a typical virtual media server tape library, such as the IBM 3494, contains 50,000 logical volumes. Management of a virtual media server database for tracking the logical and physical volume relationship is accomplished by the virtual media server. Each of the physical volumes and its stacked logical volumes is stored in a library storage cell which is accessed by an accessor robot and delivered to a data storage drive. Operation of the library accessor is controlled by a library manager. Management of a library manager database is accomplished by the library manager for tracking the physical volumes and the storage cells.

Often, a host system will expire the data in a logical volume when it is superseded by subsequent data, or upon an administrator providing a command indicating that the data is no longer needed. It would be advantageous for the host system to "eject" the logical volume, and delete the expired logical volume from the databases, reducing the size of the databases. However, because of the fact that the logical volume is tracked by multiple databases, including databases in the host system, by the virtual media server database and by the library manager database, and there is no ability to determine whether the logical volume is clearly inactive to any host system, any attempt by a host system to eject the logical volume is currently rejected by the library manager. Thus, even though no active data is contained in the logical volume, it remains in the databases.

The only ability to eject or delete a logical volume is if the volume is newly inserted into the system and placed in an insert category, having, by definition, no active data on the logical volume.

As described in commonly assigned U.S. Pat. No. 5,546,557, host systems have programming allowing them to eject data storage volumes that are no longer needed in a data storage device, when they are operating with an individual data storage device in native mode. But there is no present method that would allow the host system to eject a logical volume from a data storage subsystem by guaranteeing that an ejected logical volume is no longer active or needed.

SUMMARY OF THE INVENTION

It is an object of the present invention to handle host system requests to eject a logical volume, without altering host system programming.

Disclosed is a method of handling eject requests of logical volumes received by a data storage subsystem from a host system. The method is implemented in a programmed data storage subsystem, an article of manufacture comprising a computer readable medium having computer readable program code embodied therein, and a computer program product. The data storage subsystem may, in a preferred embodiment, comprise a data storage library for storing and retrieving physical media volumes from storage cells, wherein the physical media volumes may contain a plurality of stacked logical volumes. The data storage subsystem has a virtual media server with a virtual media server database relating logical volumes, physical volumes and the status of the logical volumes, the status representing current operations relating to the logical volumes commanded by a host system. The data storage subsystem also has a library manager with a library manager database relating physical volumes, logical volumes, storage cells and attributes of the logical volumes.

The method comprises placing identified logical volumes in catagories as not containing active data (or scratch); receiving from the host system a request to eject a logical volume from the data storage subsystem; responding to the eject request to determine whether the requested logical volume is in a category marked as scratch; if, in the determining step, the requested logical volume is determined to be in a scratch category, notifying the virtual media server that the requested logical volume is deletable; the virtual media server, in response to the notification, determining from the virtual media server database whether the status of the requested logical volume allows deletion thereof; and if the virtual media server status determining step allows deletion of the requested logical volume, deleting the requested logical volume from both the virtual media server database and the library manager database. The method may additionally notify the requesting host system of the deletion of the requested logical volume.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
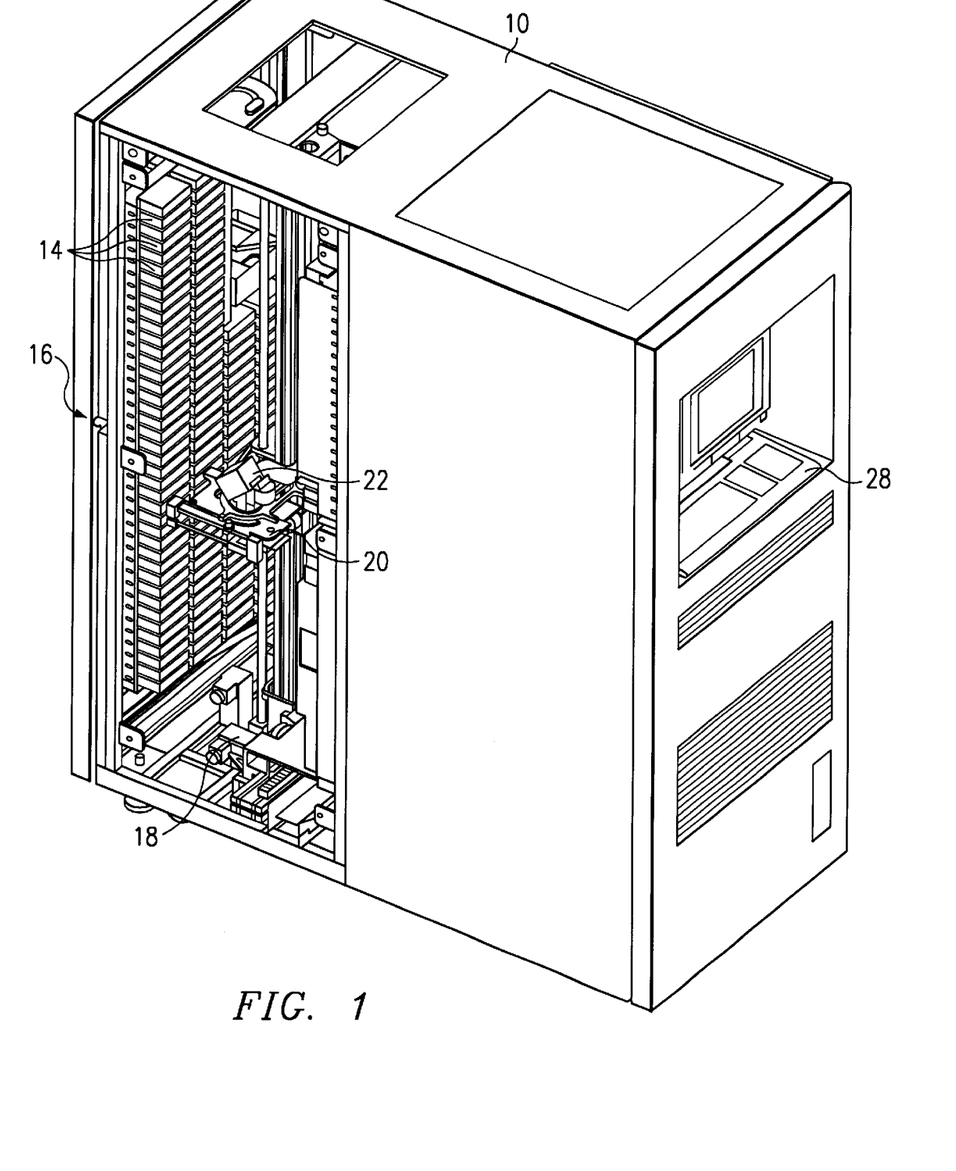
FIG. 1 is an isometric view of a data storage subsystem which may implement the present invention.
Figure 2:
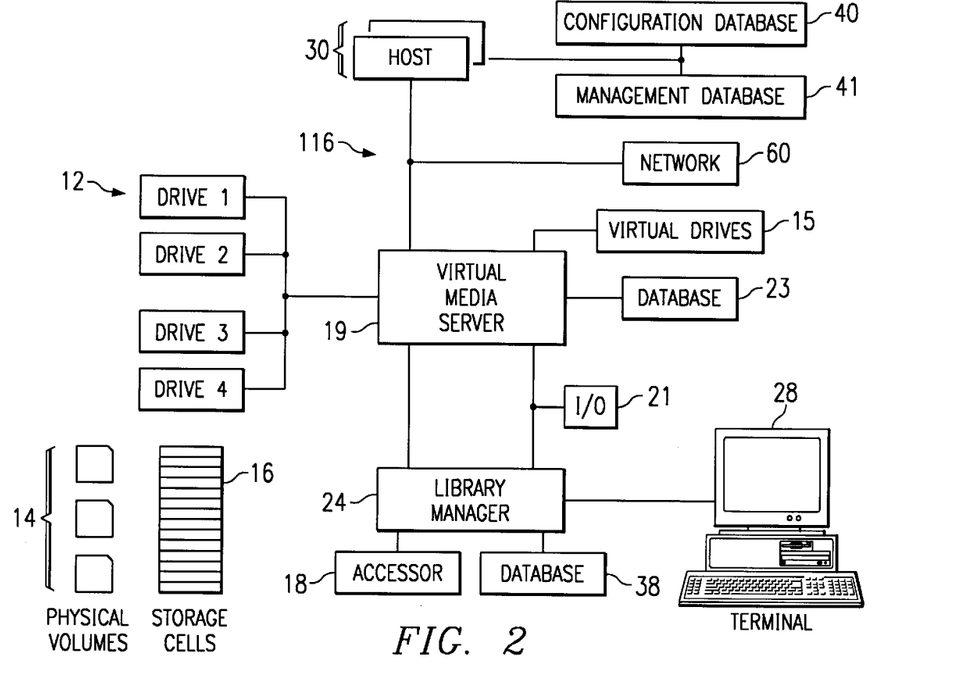
FIG. 2 is a block diagram of the data storage subsystem of FIG. 1.

Referring to FIGS. 1 and 2, a data storage subsystem 10 is illustrated which, as an example, comprises an automated tape cartridge storage and retrieval library for storing and accessing physical volumes of tape cartridges, each capable of having plural logical volumes thereon. Alternatively, the data storage subsystem 10 may comprise an optical storage and retrieval library or a tape cassette library, etc. The data storage subsystem 10 includes one or more drive units 12 for reading and/or writing data on the physical volumes, physical volume media cartridges 14 stored in cells 16, an accessor 18, a virtual TU998040 media server 19 and a library manager 24. The accessor 18 transports a selected physical volume 14 between a storage cell 16 and a drive 12. The accessor 18 includes a cartridge gripper 20 and a bar code scanner 22, or similar vision system, mounted on the gripper 20, to "read" identifying cartridge labels. The drives 12 can be optical disk drives or magnetic tape drives and the physical volumes can comprise cartridges or cassettes containing optical or magnetic media, respectively, or any other removable media and associated drives. An example of a data storage subsystem 10 which may implement the present invention is the IBM 3494 Tape Library Dataserver.

The virtual media server 19 and library manager 24, comprise at least one computer processor, have an input/output station 21. The computer processor may comprise for example, an IBM RS/6000 processor. Alternatively, virtual media server 19 and library manager 24 may each comprise a computer processor, and the computer processors are interconnected. The input/output station 21 may comprise a station for reading a data storage medium, such as a floppy disk, as will be explained. Logical volumes may be accessed in virtual drives 15 located in the memory of the virtual media server 19.

The virtual media server 19 is coupled with, and controls the load/unload and related actions of, the drives 12 (through their associated controllers), and the library manager 24 is coupled with, and controls the actions of the accessor 18. The virtual media server is coupled through a provided interface 16 to one or more host systems 30. The host systems provide commands to the virtual media server to retrieve selected logical volumes and deliver the selected volumes to selected ones of the virtual drives 15. The virtual media server 19 has a virtual media server database 23 which includes storage (typically one or more hard disk drives) for tables and programs, including a table which relates the logical volumes to the physical volumes, for instructing the library manager to retrieve a selected physical volume 14 which contains a logical volume requested by a host. Data access commands and information to be recorded on, or to be read from, selected logical volumes on the physical volumes 14 are transmitted between the physical drives 12, virtual drives 15 and the host 30.

The library manager 24 is provided with a terminal 28, allowing an operator to communicate with the library manager. Library manager 24 is provided with a library manager database 38, which includes storage (which may be the same or different hard disk drives as employed for virtual media server database) for tables and programs, including a table which relates physical volumes to storage cells, for controlling the robot accessor to retrieve a selected physical volume from the storage cell in which it is stored. The library manager database additionally relates logical volumes, physical volumes, and categories of logical volumes.

Figure 3:
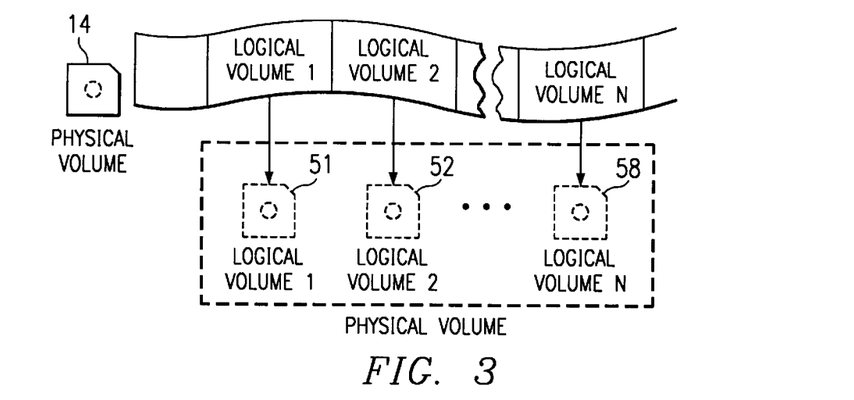
FIG. 3 is a generalized diagram of logical volumes stored on a single physical volume for use in the data storage subsystem of FIG. 1.

FIG. 3 is a schematic representation of a physical volume 14, such as a magnetic tape in a cartridge, which contains N logical volumes, thereby replacing N individual tape cartridges 51 through 58. The storage of multiple logical volumes in a single physical volume is called "volume stacking". In one configuration, a single physical volume can include up to 140 logical volumes of 50 MB each, each of which can be individually addressed and accessed. In another configuration a single physical volume can include a variable number of logical volumes of variable size, each of which can be individually addressed and accessed.

The key identifier for both logical volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library accessor. Thus, physical volume 14 will have a VOLSER as will the logical volumes 51 through 58.

Referring to FIG. 2, host processors 30 typically include a data storage system administration program, such as DFSMS (Data Facility Storage Management System) available from IBM. The hosts have two databases under the data storage system administration program, which may be called a tape configuration database 40 and a tape management systems database 41. The tape configuration database 40 allows the data storage system administration program to manage the volumes associated with each data storage subsystem 10 coupled to the host. The tape management system database 41 allows the data storage system administration program to manage the data sets that reside on the volumes, including the expiration, owner, access, etc. For example, if all data sets on a logical volume have expired, the tape management system indicates that the volume can be returned to scratch status.

The data storage system administration program maintains (in the tape configuration database 40) a system volume catalog of the volumes by VOLSER and having other data relating to the volumes. Each logical volume appears as an addressable data storing volume to the host processor 30 that is mountable in one of the virtual drives 15 in the library.

A helpful tool in managing the massive numbers of logical volumes that can be stored in such libraries is the concept of "Categories". As described in the '557 patent, a category may be defined for data storage volumes having a common relationship or attribute, such as scratch volumes, which are volumes that have only expired data and which may be used for rewriting with new data. Typically, a category comprises a number of logical volumes grouped together, which are arranged by a host system 30.

A host system tape management system will expire the data in a logical volume when it is superseded by subsequent data, or upon an administrator providing a command indicating that the data is no longer needed. The host system will then place the logical volume in "scratch" category located in the data storage subsystem 10. If the host system has no immediate need to replace the expired data with new data sets, it would be advantageous for the host system to "eject" the logical volume, and delete the expired logical volume from its databases 40 and 41, reducing the size of the databases. However, as described above, because of the fact that the logical volume is tracked by databases in the host system, by the virtual media server database and by the library manager database, and there is no ability by the library manager 24 to determine whether the logical volume is clearly inactive to any host system, any attempt by a host system to eject the logical volume is currently rejected by the library manager. Thus, even though no active data is contained in the logical volume, it remains in the databases.

The method of the present invention provides a method for handling eject requests from hosts for virtual media servers of data storage subsystems. Preferably, each of the functions and capability described is conducted by a processor in accordance with computer readable program code.

Figures 4, 5:
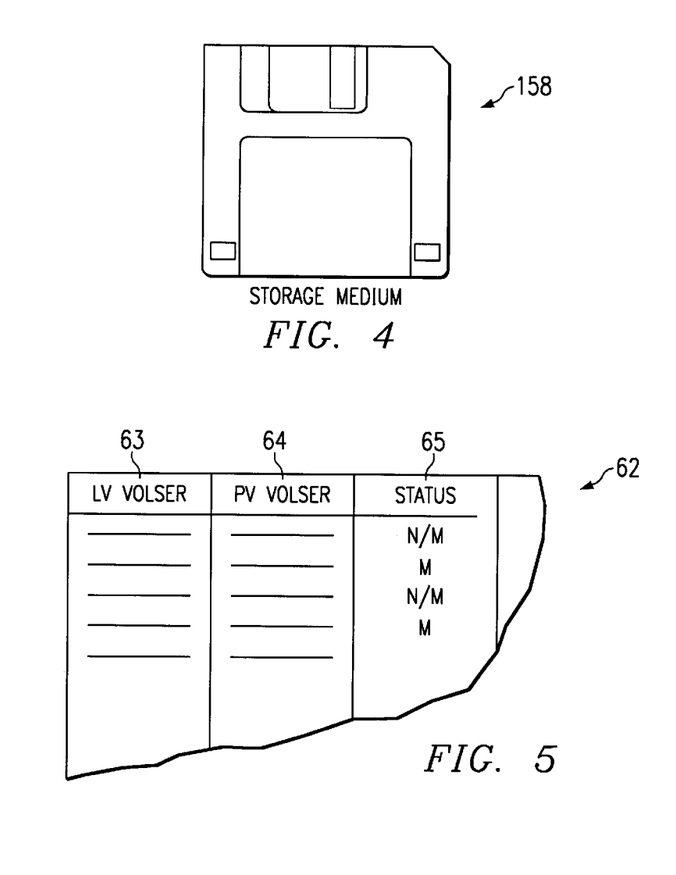
FIG. 4 is an illustration of a storage medium for storing computer executable instructions.
FIG. 5 is a diagrammatic illustration of a logical volume status table in a virtual media server database of the data storage subsystem of FIG. 2.

Referring to FIGS. 2 and 4, the computer readable program code of a computer program product(s) may be supplied at I/O station 21 from a storage medium 158 which stores executable computer instructions. The illustrated example of a storage medium which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The computer program product may alternatively be supplied electronically, as from a network 60 at a communications interface. In the embodiment of FIG. 2, the computer readable program code operates the virtual media server 19 and library manager 24, through their computer processor or processors.

In accordance with the method of the present invention, upon a host system requesting an ejection of a logical volume, the virtual media server and the library manager verify that the logical volume is available to be deleted, and coordinate all of the databases to delete the logical volume, without altering host system programming.

In accordance with the present invention, FIG. 5 illustrates a table 62 of the virtual media server database 23 relating logical volumes 63, physical volumes 64 and the status 65 of the logical volumes, the status representing current operations relating to the logical volumes commanded by a host system. Examples of status include "N/M", representing volumes that are not mounted, and "M", representing volumes that are mounted or are being mounted on a virtual drive 15. Although alphabetic codes are illustrated in FIG. 5, the actual codes comprise hexadecimal numbers.

Figure 6A:
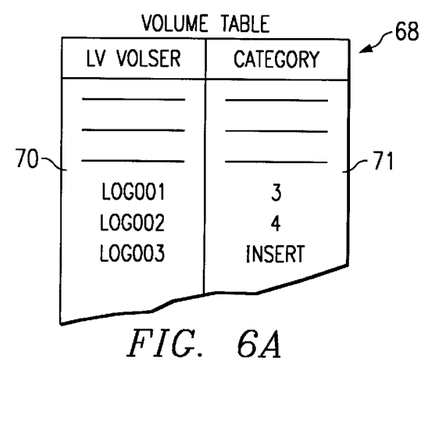
FIGS. 6A and 6B are diagrammatic illustrations of logical volume and category tables in a library manager database of the data storage subsystem of FIG. 2.
Figure 6B:
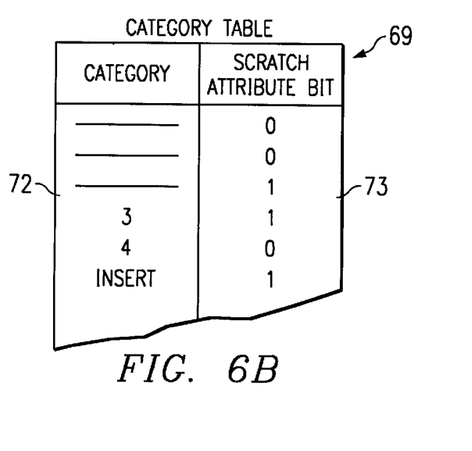

FIG. 6A and 6B illustrate a relational database included in the library manager database 38 comprising a volume table 68 of FIG. 6A and a category table 69 of FIG. 6B. The volume table 68 shows the relationship between logical volumes 70 and categories 71, and the category table 69 shows the relationship between categories 72 and the scratch attribute 73. Specifically, in the illustrated embodiment, the category of a logical volume is determined by looking in the volume table 68, and the category table is utilized to determine whether a category 72 is scratch, "1", or private, "0".

Examples of categories 71 and 72 include "3", representing scratch volumes, and "4", representing private volumes assigned to a host. Another example is the "INSERT" category, discussed above.

Figure 7A:
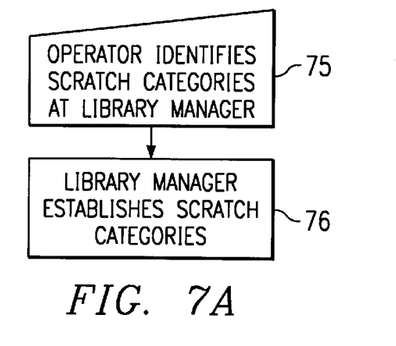
FIGS. 7A, 7B and 8 are flow charts depicting the method of the present invention.
Figure 7B:
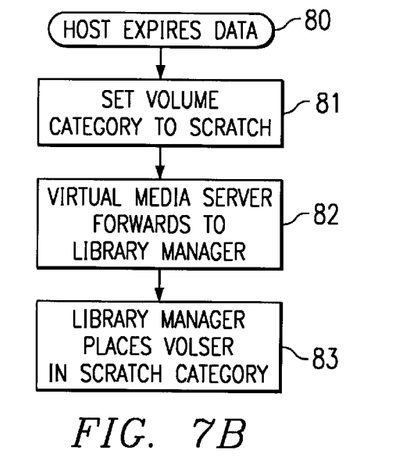
Figure 8:
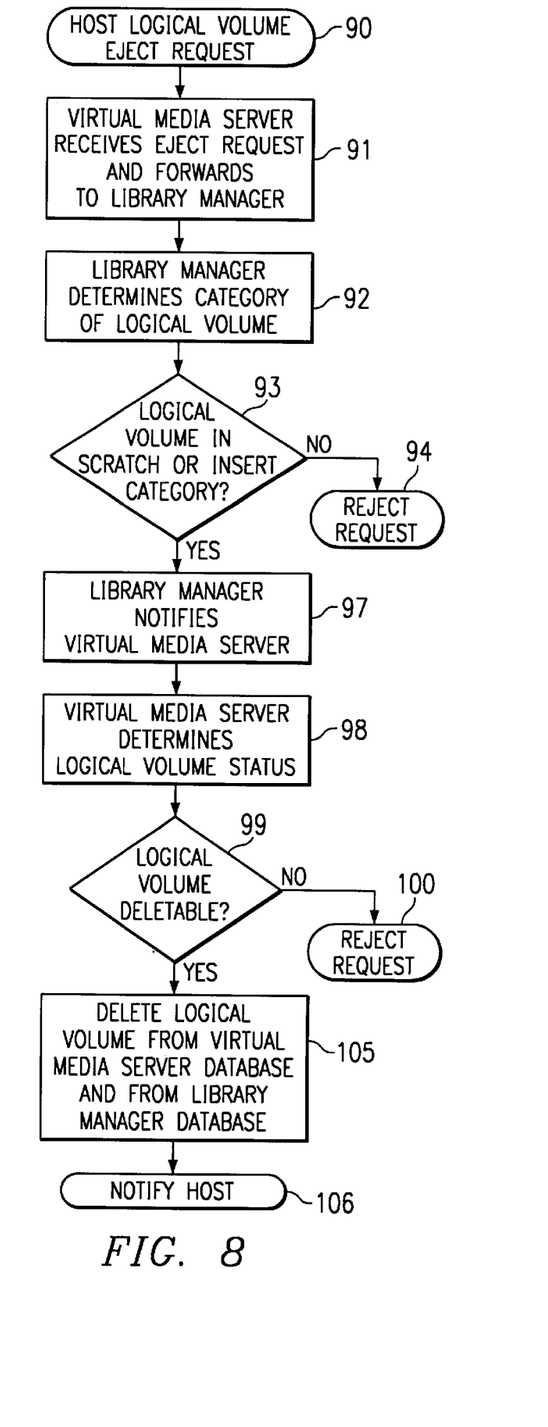

An embodiment of the method of the present invention is illustrated in FIGS. 7A, 7B and 8. Preferably, refering to FIG. 7A, an operator at terminal 28, typically using a panel, in step 75, identifies certain categories that are "scratch". The logical volumes in a scratch category are thus ready to be overwritten by new data by a host system, or, in accordance with the present invention, are available to be ejected by a host. The library manager, in step 76, establishes the identified categories as scratch in the category table 69 of FIG. 6B.

Referring to FIG. 7B and additionally to FIG. 2, a host system 30 initiates the method of the present invention in step 80 by expiring the data of a logical volume. As discussed above, typically, the host system determines that all of the data sets in a logical volume have been expired, and then, in step 81, provides a "SET VOLUME CATEGORY" command to the virtual media server 19 to set the category of the logical volume to a "SCRATCH" category, such as category "3". In step 82, the virtual media server 19 passes the command to the library manager 24. The library manager 24 then, in step 83, places the logical volume VOLSER in category "3" (a scratch category) in the volume table 68 (FIG. 6A) in the library manager database 38.

In a subsequent step 90, the host system 30 may provide a command to "EJECT" the logical volume. The host system has previously returned the logical volume to "SCRATCH" in step 81, and now desires to eject the logical volume, deleting it from its databases 40 and 41, as discussed above.

In step 91, the virtual media server 19 receives the "EJECT" request and forwards the request to the library manager 24. In step 92, the library manager responds to the "EJECT" request, checking the volume table 68 in the library manager database 38 for the logical volume, and determines the category of the logical volume. In step 93, the library manager determines the scratch attribute of the category from the category table 69. If the category is a "private" category ("0") and not deletable, "NO", the library manager 24, in step 94, rejects the "EJECT" request, notifying the virtual media server 19, which in turn notifies the requesting host system 30. The host system must then maintain the logical volume in its databases 40 and 41, designated in the "SCRATCH" category.

Upon step 93 indicating that the logical volume category is determined, from category table 69, as a "scratch" category "1" and deletable, "YES", the library manager 24, in step 97, notifies the virtual media server 19 that the requested logical volume is deletable.

Then, to insure that the logical volume is available for deletion, the virtual media server 19, in response to the notification of step 97, determines (step 98), from the table 62 of FIG. 5 in the virtual media server database 23, whether the status (column 65) of the requested logical volume allows deletion thereof. Referring to column 65 of table 62 in FIG. 5, the logical volume having the status "N/M", or not mounted, is available for deletion. However, the other logical volumes, marked "M" are in use or comprise active data and are not available for deletion, as discussed above.

In step 99, if the logical volume is found from the status determining step 98 to be unavailable for deletion, "NO", the "EJECT" request of the host system is rejected in step 100 by the virtual media server 19 and the virtual media server notifies the library manager 24, which in turn notifies the requesting host system 30.

If, in step 99, the virtual media server status determining step 98 allows deletion of the requested logical volume, "YES", the virtual media server 19 and the library manager 24 delete, in step 105, the requested logical volume from both the virtual media server database 23 and the library manager database 38. There is thus no pointer to the logical volume in either of the databases, and the space previously occupied by the pointers and additional information relating to the logical volume is freed up.

Then, in step 106, the virtual media server 19 signals the library manager, which in turn signals the requesting host system 30, notifying the requesting host system of the deletion of the requested logical volume. The host system 30 may then delete the logical volume from its databases 40 and 41 as though the logical volume were a physical volume that has been ejected from the data storage subsystem 10.

One of skill in the art will understand that alternative software and hardware embodiments of the present invention may be envisioned having a virtual media server and library manager combined in a single processor and performing a combined function, or further, separated into separate hardware either internal or external to the data storage library.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method of handling eject requests of logical volumes received by a data storage subsystem from a host system, said data storage subsystem having a virtual media server with a virtual media server database relating logical volumes, physical volumes and the status of the logical volumes, said status representing current operations relating to said logical volumes commanded by a host system, having a library manager with a library manager database relating physical volumes, logical volumes, storage cells and categories of said logical volumes, and having a data storage library for storing and retrieving physical media volumes from storage cells, wherein said physical media volumes may contain a plurality of stacked logical volumes, comprising the steps of:

placing identified logical volumes in scratch categories;

receiving from said host system an eject request of a logical volume from said data storage subsystem;

responding to said eject request to determine whether said requested logical volume is in a scratch category;

if, in said category determining step, said requested logical volume is determined to be in a scratch category, notifying said virtual media server that said requested logical volume is deletable; else, rejecting said reject request;

said virtual media server, in response to said notification, determining from said virtual media server database whether said status of said requested logical volume allows deletion thereof; and if said virtual media server status determining step allows deletion of said requested logical volume, deleting said requested logical volume from both said virtual media server database and said library manager database; else rejecting said elect request.

2. The method of claim 1, comprising the additional steps of notifying said requesting host system of said deletion of said requested logical volume; and of notifying said requesting host system of said rejection of said eject request.

3. The method of claim 1, wherein said step of placing said identified logical volumes in scratch categories comprises placing said identified logical volumes in scratch categories in a volume table of said library manager database; and said category determining step additionally comprises searching said volume table of said library manager database and identifying whether said requested logical volume is in a scratch category and deletable in said volume table.

4. The method of claim 3, wherein said data storage subsystem additionally comprises a terminal interface for receiving commands identifying scratch categories, and wherein method additionally comprises an initial step responsive to said received commands at said terminal interface to establish scratch categories in a category table of said library manager database.

5. The method of claim 3, wherein said status determining step comprises determining that there are no current operations relating to said logical volume commanded by a host system other than said eject request.

6. The method of claim 3, wherein said physical volumes comprise magnetic tape media physical volumes.

7. The method of claim 3, wherein said physical volumes comprise optical media physical volumes.

8. An article of manufacture comprising a computer readable medium having computer readable program code embodied therein for operating a computer processor of a data storage subsystem, said data storage subsystem having a virtual media server with a virtual media server database relating logical volumes, physical volumes and the status of the logical volumes, said status representing current operations relating to said logical volumes commanded by a host system, having a library manager with a library manager database relating physical volumes, logical volumes, storage cells and categories of said logical volumes, and having a data storage library for storing and retrieving physical volumes from storage cells, wherein said physical volumes may contain a plurality of logical volumes, comprising:

computer readable program code which causes said computer processor to place identified logical volumes in scratch categories;

computer readable program code which causes said computer processor to respond to an eject request from a host system of a logical volume from said data storage subsystem to determine whether said requested logical volume is in a scratch category;

computer readable program code which causes said computer processor to, if said requested logical volume is determined to be in a scratch category, notify said virtual media server that said requested logical volume is deletable; else, reject said elect request;

computer readable program code which causes said computer processor, in response to said notification, to determine from said virtual media server database whether said status of said requested logical volume allows deletion thereof; and computer readable program code which causes said computer processor to, if said virtual media server status determination allows deletion of said requested logical volume, delete said requested logical volume from both said virtual media server database and said library manager database; else, reject said elect request.

9. The article of manufacture of claim 8, additionally comprising computer readable program code which causes said computer processor to notify said requesting host system of said deletion of said requested logical volume; and to notify said requesting host system of said rejection of said elect request.

10. The article of manufacture of claim 8, wherein said computer readable program code which causes said computer processor to place said identified logical volumes in scratch categories comprises placing said identified logical volumes in scratch categories in a volume table of said library manager database; and said computer readable program code which causes said computer processor to determine whether said requested logical volume is in a scratch category additionally comprises searching said volume table of said library manager database and identifying whether said requested logical volume is in a scratch category and deletable in said volume table.

11. The article of manufacture of claim 10, wherein said data storage subsystem additionally comprises a terminal interface for receiving commands identifying scratch categories, and wherein said computer readable program code additionally causes said computer processor to initially respond to said received commands at said terminal interface to establish scratch categories in a category table of said library manager database.

12. The article of manufacture of claim 10, wherein said computer readable program code which causes said computer processor to determine said status comprises determining that there are no current operations relating to said logical volume commanded by a host system other than said eject request.

13. The article of manufacture of claim 10, wherein said physical volumes comprise magnetic tape media physical volumes.

14. The article of manufacture of claim 10, wherein said physical volumes comprise optical media physical volumes.

15. A computer program product usable with a programmable computer having computer readable program code embodied therein for operating a computer processor of a data storage subsystem, said data storage subsystem having a virtual media server with a virtual media server database relating logical volumes, physical volumes and the status of the logical volumes, said status representing current operations relating to said logical volumes commanded by a host system, having a library manager with a library manager database relating physical volumes, logical volumes, storage cells and categories of said logical volumes, and having a data storage library for storing and retrieving physical volumes from storage cells, wherein said physical volumes may contain a plurality of logical volumes, comprising:

computer readable program code which causes said computer processor to place identified logical volumes in scratch categories;

computer readable program code which causes said computer processor to respond to an eject request from a host system of a logical volume from said data storage subsystem to determine whether said requested logical volume is in a scratch category;

computer readable program code which causes said computer processor to, if said requested logical volume is determined to be in a scratch category, notify said virtual media server that said requested logical volume is deletable; else, reject said elect request;

computer readable program code which causes said computer processor to, in response to said notification, determine from said virtual media server database whether said status of said requested logical volume allows deletion thereof; and computer readable program code which causes said computer processor to, if said virtual media server status determination allows deletion of said requested logical volume, delete said requested logical volume from both said virtual media server database and said library manager database; else, reject said elect request.

16. The computer program product of claim 15, additionally comprising computer readable program code which causes said computer processor to notify said requesting host system of said deletion of said requested logical volume; and to notify said requesting host system of said rejection of said elect request.

17. The computer program product of claim 15, wherein said computer readable program code which causes said computer processor to place said identified logical volumes in scratch categories comprises placing said identified logical volumes in scratch categories in a volume table of said library manager database; and said computer readable program code which causes said computer processor to determine whether said requested logical volume is in a scratch category additionally comprises searching said volume table of said library manager database and identifying whether said requested logical volume is in a scratch category and deletable in said volume table.

18. The computer program product of claim 17, wherein said data storage subsystem additionally comprises a terminal interface for receiving commands identifying scratch categories, and wherein said computer readable program code additionally causes said computer processor to initially respond to said received commands at said terminal interface to establish scratch categories in a category table of said library manager database.

19. The computer program product of claim 17, wherein said computer readable program code which causes said computer processor to determine said status comprises determining that there are no current operations relating to said logical volume commanded by a host system other than said eject request.

20. The computer program product of claim 17, wherein said physical volumes comprise magnetic tape media physical volumes.

21. The computer program product of claim 17, wherein said physical volumes comprise optical media physical volumes.

22. A data storage subsystem, comprising:
   a host interface for coupling to at least one host system;
   a data storage library for storing and retrieving physical volumes which may contain a plurality of logical volumes;
   a virtual media server coupled to said host interface for responding to requests from said host systems for controlling the storage and retrieval of said logical volumes, said virtual media server having a virtual media server database relating logical volumes, physical volumes and the status of said logical volumes, said status representing current operations relating to said logical volumes commanded by a host system; and
   a library manager coupled to said virtual media server and coupled to said data storage library for responding to said storage and retrieval control by said virtual media server for controlling the operation of said data storage library, said library manager having a library manager database relating physical volumes, logical volumes, storage cells and categories of said logical volumes;
   wherein said virtual media server and said library manager are programmed to perform a method for handling eject requests of logical volumes received from a host system at said host interface, the method comprising:
      placing, in response to identifying commands received at said host interface, identified logical volumes in scratch categories;
      receiving, at said host interface, from said host system an eject request of a logical volume from said data storage subsystem;
      responding to said eject request to determine whether said requested logical volume is in a scratch category;
      if, in said category determining step, said requested logical volume is determined to be in a scratch category, notifying said virtual media server that said requested logical volume is deletable; else, rejecting said eject request;
      said virtual media server, in response to said notification, determining from said virtual media server database whether said status of said requested logical volume allows deletion thereof; and
      if said virtual media server status determining step allows deletion of said requested logical volume, deleting said requested logical volume from both said virtual media server database and said library manager database; else, rejecting said elect request.

23. The data storage subsystem of claim 22, wherein said virtual media server and said library manager are programmed to perform the additional steps of notifying said requesting host system at said host interface of said deletion of said requested logical volume; and of notifying said requesting host system at said host interface of said rejection of said eject request.

24. The data storage subsystem of claim 22, wherein said programmed step of placing said identified logical volumes in scratch categories comprises placing said identified logical volumes in scratch categories in a volume table of said library manager database; and said programmed category determining step additionally comprises searching said volume table of said library manager database and identifying whether said requested logical volume is in a scratch category and deletable in said volume table.

25. The data storage subsystem of claim 24, wherein said programmed status determining step comprises determining that there are no current operations relating to said logical volume commanded by a host system other than said eject request.

26. The data storage subsystem of claim 24, wherein said physical volumes comprise magnetic tape media physical volumes.

27. The data storage subsystem of claim 24, wherein said physical volumes comprise optical media physical volumes.

\* \* \* \* \*